(12) United States Patent
Littlejohn et al.

(10) Patent No.: US 11,601,338 B2
(45) Date of Patent: *Mar. 7, 2023

(54) METHOD FOR GATHERING TRAFFIC ANALYTICS DATA ABOUT A COMMUNICATION NETWORK

(71) Applicant: RISC Networks, LLC, Asheville, NC (US)

(72) Inventors: Jeremy Littlejohn, Fairview, NC (US); Greg Watts, Nottingham, NH (US)

(73) Assignee: RISC Networks, LLC, Asheville, NC (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/132,596

(22) Filed: Dec. 23, 2020

(65) Prior Publication Data

US 2021/0297323 A1 Sep. 23, 2021

Related U.S. Application Data

(63) Continuation of application No. 16/595,247, filed on Oct. 7, 2019, now Pat. No. 10,887,184, which is a continuation of application No. 15/625,762, filed on Jun. 16, 2017, now Pat. No. 10,439,885, which is a continuation of application No. 14/506,082, filed on Oct. 3, 2014, now Pat. No. 9,712,397.

(51) Int. Cl.
*H04L 12/24* (2006.01)
*H04L 41/14* (2022.01)
*H04L 41/0853* (2022.01)
*H04L 41/12* (2022.01)
*H04L 43/0811* (2022.01)
*H04L 41/0826* (2022.01)

(52) U.S. Cl.
CPC .......... *H04L 41/14* (2013.01); *H04L 41/0826* (2013.01); *H04L 41/0853* (2013.01); *H04L 41/12* (2013.01); *H04L 43/0811* (2013.01)

(58) Field of Classification Search
CPC ...... H04L 41/14; H04L 41/0853; H04L 41/12
See application file for complete search history.

(56) References Cited

U.S. PATENT DOCUMENTS

| 9,712,397 B2 | 7/2017 | Littlejohn et al. | |
| 10,439,885 B2 | 10/2019 | Littlejohn et al. | |
| 2003/0107490 A1* | 6/2003 | Sznaider | G08B 21/10 340/601 |
| 2012/0317276 A1* | 12/2012 | Muniraju | H04L 41/14 709/224 |
| 2014/0351424 A1* | 11/2014 | Madani | H04L 41/5051 709/224 |

* cited by examiner

*Primary Examiner* — Arvin Eskandarnia
(74) *Attorney, Agent, or Firm* — Knobbe, Martens, Olson & Bear, LLP

(57) ABSTRACT

There is provided a method for gathering traffic analytics data about a communication network that includes applying a heuristic that focuses on specific attributes of the communications relationships between the system assets of a network.

20 Claims, 8 Drawing Sheets

470

484 >>>>>>>>>>>

METHOD FOR GATHERING TRAFFIC ANALYTICS DATA ABOUT A COMMUNICATION NETWORK

BACKGROUND OF THE INVENTION

US Published Patent Application No. 2011/0246376 to Devakondra et al points out that network data processing systems are used for a variety of different purposes and come in a number of different forms. Several types of network data processing systems are commonly used by companies and other organizations and may include, for example, local area networks, wide area networks, virtual private networks, and other suitable types of networks. In addition to such networks that may be maintained by the network operator itself, cloud services are available and the users of this type of network data processing systems neither own nor manage the physical infrastructure.

According to US Published Patent Application Number 2011/0270968 to Salsburg at al, the term "cloud computing" generally refers to a model that makes computing resources available over a network as services. Computing services provided in a cloud computing environment can be broadly divided into three categories: (a) Infrastructure-as-a-Service ("IaaS") generally seen as comprising the delivery of computer hardware (e.g., servers, data storage systems, routers, etc.) as a service, (b) Platform-as-a-Service ("PaaS") generally seen as comprising the delivery of a computing platform or solution stack as a service, and (c) Software-as-a-Service ("SaaS") generally seen as comprising hosting complete applications and delivering the applications as a service.

A "cloud" is a set of computing resources, such as computer hardware, data storage, networks, applications, services, and Interfaces, that allow computing to be delivered as a service. A cloud can be a private cloud, a public cloud, or a hybrid cloud that combines both public and private clouds. A private cloud typically includes a data center or proprietary network that provides computing services to a group of people, an organization, a business, or another entity. A private cloud may be located within an organization's private network or within a private space dedicated to an organization within a cloud vendor data center. A public cloud is a cloud in which computing services are made available to the public, typically for a fee. For example, a cloud service provider may make computing resources available to an organization via the Internet. A public cloud may be configured as a web service that allows users to manage computing resources hosted by the public cloud via a web interface.

In a public cloud environment, computing resources are provided to a user on demand and In various sizes and configurations. For example, a user may utilize a public cloud for storing a small amount of data or for hosting processor intensive software applications. A user can also request additional resources on demand and de-allocate resources when they are no longer required. This flexibility and elasticity has made cloud computing attractive to many businesses and IT professionals. In addition to this flexibility and elasticity, cloud computing can enable an organization to reduce capital expenses normally allocated to IT infrastructure. However, there are many factors to consider before an organization moves a computing workload to a public cloud. For example, according to US Published Patent Application Number 2011/0270968 to Salsburg et al, there is a need to validate business applications (workloads) in terms of technical portability and business requirements/compliance so that the workloads can be deployed into a cloud without considerable customization. Conventionally, according to US Published Patent Application Number 2011/0270968 to Salsburg et al, this validation is accomplished using a manual, time consuming process for workload identification, workload classification, and cloud provider assessment to find the 'best-fit' for business workload hosting.

Organizations that employ more traditional types of network data processing systems may contemplate whether to change over from their more traditional network environment to a cloud network environment. In view of the fact that the particular cloud services offered by each cloud service provider or vendor will have different features, benefits, service operating requirements, and costs, it would be advantageous for a network operator to have access to tools that can help guide a decision to migrate computing tasks to a cloud. Moreover, it would be advantageous if such tools for a guiding a network operator could equip the network operator to have an accurate picture of the computing resources in its own network that will or can be replaced by the cloud computing resources. Furthermore, network operators can make better informed decisions about purchasing cloud services if they can get pricing information about potential cloud service providers and, especially, pricing information about the scope of computing resources that tasks could be taken over in a cloud service arrangement.

SUMMARY OF THE INVENTION

One object of the present invention is to provide a method for gathering traffic analytics data about a communication network that includes the steps of creating an inventory collection of system assets, ascribing, with respect to a reference set of communication signals, a touchstone tag to each communication signal, analyzing the communication traffic comprised of touchstone-tagged communication signals having transit relationships with certain network resources, and deriving traffic analytics data from the analysis. In connection with further details of the step of creating an inventory collection of system assets, this step includes identifying system assets of the network, the system assets including one or both (1) network resources that are operable to distribute communication signals that transit to and between these network resources with each network resource having a transit relationship with a communication signal in that the network resource may originate a communication signal and/or receive a communication signal and (2) entity applications that direct distributions of communication signals to and between several system assets. Also, this step of creating an inventory collection of system assets includes, with regard to selected ones of the system assets, assigning a location assignment to the system asset that classifies the system asset as having a location associated with a respective one of the network resources. In connection with further details of the step of ascribing a touchstone tag to each communication signal of a reference set of communication signals, this step includes ascribing to each communication signal a touchstone tag that indicates that the so-tagged communication signal has a transit relationship with a respective one of the network resources.

In connection with further details of the step of analyzing the communication traffic, this step involves, with respect to a first resource location group which includes a first set of network resources having a location attribute in common with one another and a second resource location group having a location attribute in common with one another, the first set of network resources and the second set of network resources being different from one another, analyzing the communication traffic comprised of touchstone-tagged communication signals having transit relationships with the network resources of the first set of network resources and the second set of network resources.

According to optional features of the method of the present invention, the method may further include the step of assessing the traffic analytics data relative to a selection of migration scenarios each of which is a scenario wherein some or all of the functions performed by some or all of the system assets would instead be performed externally of the network. Furthermore, the method may optionally include generating a migration consideration set comprised of cost information units that each include cost information about one of the migration scenarios.

According to one variation of the method of the present invention, the method for gathering traffic analytics data about a communication network includes the following steps. The method is suitable for analyzing traffic analytics of a communication network that includes a plurality of nodes and a plurality of connections between the nodes. The one variation of the method includes performing a step of cataloging an initial location, the step including: (a) identifying connectivity relationships between the nodes of a first group of nodes of the network, the identified connectivity relationships delimiting a first connectivity relationships set, (b) with respect to each identified connectivity relationship of the first relationship set, determining if the respective identified connectivity relationship is in compliance with a target array formation heuristic, whereupon each connectivity relationship of the first connectivity relationship set is catalogued into a respective one of a target array comprised of those connectivity relationships in compliance with the target array formation heuristic and a non-target array comprised of those connectivity relationships not In compliance with the target array formation heuristic, and (c) with respect to those nodes of the first group of nodes of the network whose connectivity relationships are In compliance with the target array formation heuristic, designating such nodes with a common location designator that is unique from other location designators that have been associated, via a step of cataloging a location, with nodes of the network.

The one variation of the method further includes performing a step of cataloging a subsequent location, the step including: (a) with respect to a subsequent group of nodes of the network that is different from other groups of nodes of the network that have been subjected to a location cataloging step of the method, identifying connectivity relationships between the nodes of the subsequent group of nodes, the identified connectivity relationships delimiting a subsequent connectivity relationship set, and the step of identifying connectivity relationships between the nodes of the subsequent group of nodes including considering only those connectivity relationships that have not previously been designated with a location designator during a step of cataloging a location, (b) with respect to each identified connectivity relationship of the subsequent connectivity relationship set, determining if the respective identified connectivity relationship is in compliance with the target array formation heuristic, whereupon each connectivity relationship of the subsequent connectivity relationship set is catalogued into a respective one of the target array comprised of those connectivity relationships in compliance with the target array formation heuristic and the non-target array comprised of those connectivity relationships not In compliance with the target array formation heuristic, and (c) with respect to those nodes of the subsequent group of nodes of the network whose connectivity relationships are in compliance with the target array formation heuristic, designating such nodes with with a common location designator that is unique from other location designators that have been associated, via a step of cataloging a location, with nodes of the network. The one variation of the method additionally includes repeating the step of cataloging a subsequent location until at least two nodes of the network have been designated with a location designator; and analyzing the communication traffic by referring to the location designators and deriving traffic analytics data from the analysis.

A further object of the present invention is to provide a tangible computer-readable medium for storing instructions for controlling a computing device to generate an output, the instructions controlling the computing device to perform steps including the steps of creating an inventory collection of system assets, ascribing, with respect to a reference set of communication signals, a touchstone tag to each communication signal, analyzing the communication traffic comprised of touchstone-tagged communication signals having transit relationships with certain network resources, and deriving traffic analytics data from the analysis.

Other aspects, embodiments and advantages of the present invention will become apparent from the following detailed description which, taken in conjunction with the accompanying drawings, illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which.

DETAILED DESCRIPTION OF AN EMBODIMENT OF THE INVENTION

Figure 1:
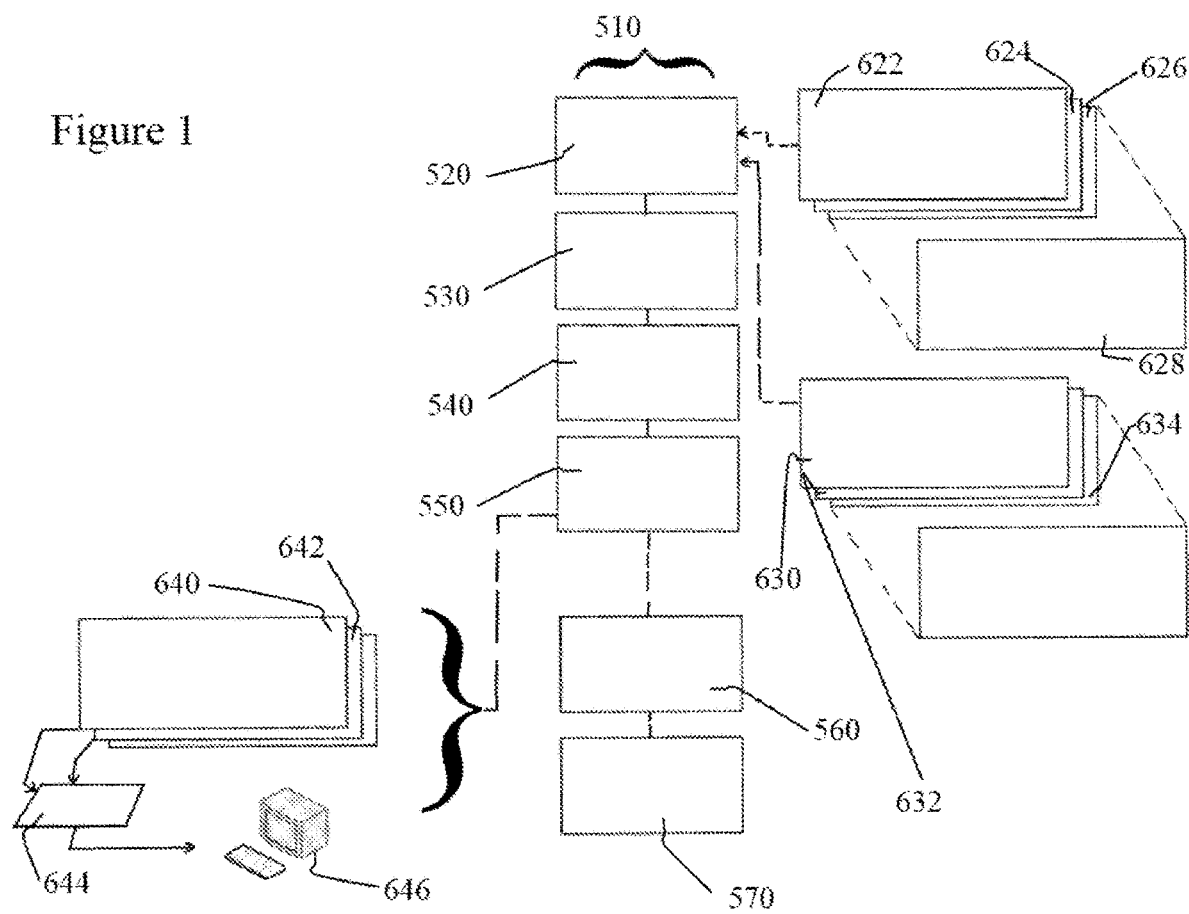
FIG. 1 is a schematic illustration of one possible sequence of steps that may be performed to implement the traffic analytics method of the present invention.

Reference is had to FIG. 1, which is a schematic illustration of one possible sequence of steps that may be performed to implement the traffic analytics method of the present invention, and the following description of the traffic analytics method and an arrangement for implementing the method on a computer. The traffic analytics method, which is hereinafter referred to as the traffic analytics method 310, can provide a network operator with tools to guide decisions about migrating computing tasks to an alternative task performer such as a private cloud computing resource or a public cloud computing resource and tools for automatically effecting the migration of selected computing tasks to an alternative task performer.

"Cloud computing" refers to the access of computing resources and data via a network infrastructure, such as the Internet. The computing resources and data storage may be provided by linked data centers of the "cloud,"—i.e., a "cloud" network. Each of the data centers may include a plurality of servers that provide computing resources, as well as data storage and retrieval capabilities. As used herein. "cloud service providers" refers to the owners or operators of the data centers that operate the "cloud" networks.

Figure 2:
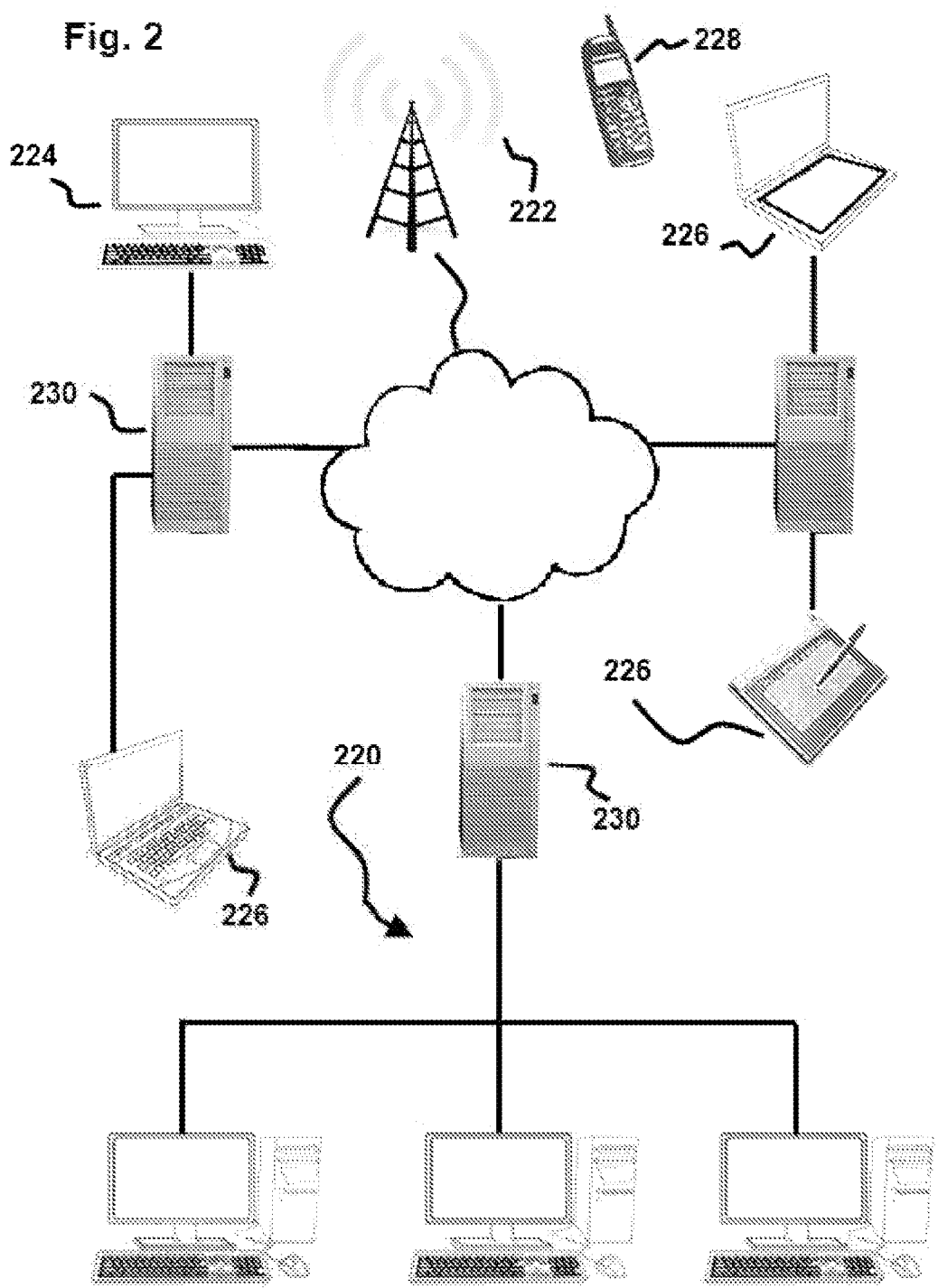
FIG. 2 is a schematic illustration of an exemplary network about which the method of the present invention can provide can provide rapidly understandable and pertinent information for use by the network operator in making decisions about migrating computing tasks to an alternative task performer such as a private cloud computing resource or a public cloud computing resource.

With reference now to FIG. 2, which is a perspective schematic view of a network, the traffic analytics method 310 will be described In further detail including how the traffic analytics method 310 can be performed to evaluate the representative network shown in FIG. 2. As seen in FIG. 2, a representative or exemplary network 220 is to be understood as representing any information technology or "IT" arrangement operable to store, manipulate, and present information to the network operator. As seen in FIG. 2, the exemplary network 220 can comprise components enabling the network to operate as a local area network, a wide area network such as the Internet, and/or a wireless network operable to receive a wireless signal from a transmitter 222. The computers comprised by the network 220 may include desktop computers 224, lap-top computers 226, hand-held computers 228 (including wireless devices such as wireless personal digital assistants (PDA) or mobile phones), or any other type of computational arrangement of hardware and/or software. The several computers may be connected to the network 220 via a server 230. It should be noted that any other type of hardware or software may be included in the system and be considered a component thereof.

The traffic analytics method 310 can be deployed to evaluate the system assets of any network that can broadly be considered to be a communications network In that the network routes and handles communication signals and such a network can be configured as a wireless network or a wired network, or a combination wireless and wired network. In the context of the network being configured as a computer network, the network can include an entirely hardware inventory of assets, an entirely software inventory of assets, or an inventory of software and hardware assets. As is well known, a computer network may be a virtual network in that a hardware asset hosts a plurality of virtual machines (VMs), each virtual machine operating as a stand alone computer and providing a characteristic computer device function such as a server function or a storage function. The host hardware asset typically includes a management entity, often called "hypervisor," that controls and manages different virtual machines.

The traffic analytics method 310 is configured for use with a network which, as schematically shown in FIG. 2, is designated as the in-place network 220 and which is to be understood as representing any communication network, information technology network or "IT" arrangement operable to store, manipulate, and present information to the network operator. As seen in FIG. 2, the in-place network 220 can comprise components enabling the network to operate as a local area network, a wide area network such as the Internet, and/or a wireless network operable to receive a wireless signal from a transmitter 222. The computers comprised by the network 220 may include desktop computers 224, lap-top computers 226, hand-held computers 228 (including wireless devices such as wireless personal digital assistants (PDA) or mobile phones), or any other type of computational arrangement of hardware and/or software. The several computers may be connected to the in-place network 220 via a server 230. It should be noted that any other type of hardware or software may be included in the system and be considered a component thereof.

With reference now to FIG. 2, which is a perspective schematic view of a network, the traffic analytics method 310 will be described in further detail including how the traffic analytics method 310 can be performed to evaluate the representative network shown in FIG. 2. As seen in FIG. 2, a representative or exemplary network 220 is to be understood as representing any information technology or "IT" arrangement operable to store, manipulate, and present information to the network operator. As seen in FIG. 2, the exemplary network 220 can comprise components enabling the network to operate as a local area network, a wide area network such as the Internet, and/or a wireless network operable to receive a wireless signal from a transmitter 222. The computers comprised by the network 220 may include desktop computers 224, laptop computers 226, hand-held computers 228 (including wireless devices such as wireless personal digital assistants (PDA) or mobile phones), or any other type of computational arrangement of hardware and/or software. The several computers may be connected to the network 220 via a server 230. It should be noted that any other type of hardware or software may be included in the system and be considered a component thereof.

The traffic analytics method 310 can be deployed to evaluate the system assets of any network that can broadly be considered to be a communications network in that the network routes and handles communication signals and such a network can be configured as a wireless network or a wired network, or a combination wireless and wired network. In the context of the network being configured as a computer network, the network can include an entirely hardware inventory of assets, an entirely software inventory of assets, or an inventory of software and hardware assets. As is well known, a computer network may be a virtual network in that a hardware asset hosts a plurality of virtual machines (VMs), each virtual machine operating as a stand alone computer and providing a characteristic computer device function such as a server function or a storage function. The host hardware asset typically includes a management entity, often called "hypervisor," that controls and manages different virtual machines.

The traffic analytics method 310 is configured for use with a network which, as schematically shown in FIG. 2, is designated as the in-place network 220 and which is to be understood as representing any communication network information technology network or "IT" arrangement operable to store, manipulate, and present information to the network operator. As seen in FIG. 2, the in-place network 220 can comprise components enabling the network to operate as a local area network, a wide area network such as the internet, and/or a wireless network operable to receive a wireless signal from a transmitter 222. The computers comprised by the network 220 may include desktop computers 224, laptop computers 226, hand-held computers 228 (including wireless devices such as wireless personal digital assistants (PDA) or mobile phones), or any other type of computational arrangement of hardware and/or software. The several computers may be connected to the in-place network 220 via a server 230. It should be noted that any other type of hardware or software may be included in the system and be considered a component thereof.

The in-place network 220 schematically illustrated in FIG. 2 includes network resources that are operable to distribute communication signals that transit to and between these network resources. Each network resource has a transit relationship with a communication signal in that the network resource may originate a communication signal and/or receive a communication signal. Communication signals can be in any form as is known in the art, including, as an example of a non-binary information signal, wireless radio wave signals or, as an example, of a binary information signal, "packets", which is intended to mean the discrete collection of information typically referred to by this term with respect to signals handled by computer hardware devices. The handling of a packet by a network is typically governed by a set of rules that defines its structure and the service it provides. As an example, the World Wide Web has a standard protocol referred to as the Hyper Text Transport Protocol (HTTP) and this standard protocol dictates how packets are constructed, how data is presented to web servers, and how these web servers return data to client web browsers. Any application that transmits data over a computer network uses one or more protocols. There are typically numerous protocols in use between computers on a network.

The network resources of the in-place network 220 are shown, solely for the sake of illustration, as including hardware assets in the form of routers, switches, servers operable to run Windows™ brand software, workstations operable to run Windows™ brand software, Linux/Unix servers, hosts operable to run VMware™ software, terminals, hubs, branches, intersections, and bridges.

The in-place network 220 includes entity applications that direct discrete distributions of communication signals between several network resources. An "entity application" is a term used in this specification to refer to any form of application run on a network and may include a group of software assets that operate cooperatively with each other to provide a processing function or may include a single software asset, proprietary to the entity operating the network or bought or leased by the entity, that provides a processing function. An "entity application" may include commercially available applications such as, for example, Windows™ brand software, Linux™ software, or VMware™ software, any form of freeware or shareware, or any form of custom software proprietary to, or licensed by, the network operator.

For purposes of further describing the traffic analytics method 310, the in-place network 220 is deemed to have a number of discrete collections of hardware assets with each discrete collection being located at a different geographic venue than the other discrete collections. A discrete collection of hardware assets may be comprised of a single hardware asset or a plurality of hardware assets. Also, for the purposes of the present specification, the term "geographic venue" shall be taken to refer to any geographic location or area that is identifiable utilizing any descriptor, metric or characteristic. The term "geographic venue" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location, zip or postal code areas, and congressional districts. Additionally, "geographic venue" can be defined in terms of country/city/state/address, country code/zip code, political region, geographic region designations, latitude/longitude coordinates, spherical coordinates, Cartesian coordinates, polar coordinates, GPS data, cell phone data, directional vectors, proximity waypoints, or any other type of geographic designation system for defining a geographical location or position.

Referring further to FIG. 1, it is to be understood that the steps of the traffic analytics method 310 can be performed in other different sequences within the scope of the present invention. As seen in FIG. 1, a method performance step sequence 510 includes a step 520 of creating an inventory collection of system assets and this step includes identifying system assets of the network, the system assets including one or both: (1) network resources that are operable to distribute communication signals that transit to and between these network resources with each network resource having a transit relationship with a communication signal in that the network resource may originate a communication signal and/or receive a communication signal and (2) entity applications that direct distributions of communication signals between several network resources. For the sake of illustration, network resources are schematically shown in FIG. 1 in the form of a server 622, a shared uplink 624, a switch 626, and a router 628 and entity applications are schematically shown in FIG. 1 as a virtualization application 630, an accounting application 632, and a spreadsheet application 634.

The inventory collection created via the step 520 can be stored in any suitable storage format and can be optionally displayed or not displayed in human-readable format. Moreover, the inventory collection may be created via any suitable inventory collection approach including, for example, via network discovery techniques capable of discovering system assets in an existing network, via reference to a previously-generated inventory collection, or via estimates of the presence or absence of the system assets of the network. Known techniques such as SMNP inventory collection can be used.

Figure 3:
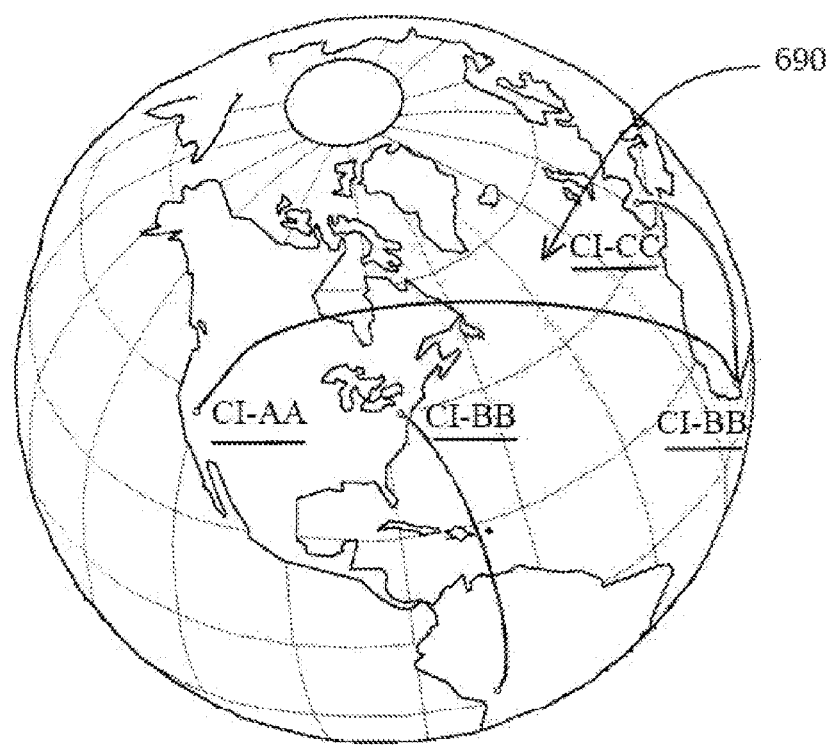
FIG. 3 is a schematic illustration of a plurality of geographic venues each of which has a discrete collection of hardware assets variously situated at different geographic venues.

The traffic analytics method 310 includes a step 530 of assigning, with regard to each of selected ones of the system assets, a location assignment that classifies the system asset as having a location associated with a respective one of the network resources. Each network resource, such as the server 622, the shared uplink 624, the switch 626, and the router 628, is, by virtue of being a hardware asset, situated at a respective geographic venue and reference is had to FIG. 3, which is a schematic illustration of a plurality of geographic venues each of which has a discrete collection of hardware assets variously situated at different geographic venues (shown on a schematic globe 690). As seen in FIG. 3, the server 622 is comprised in the respective discrete collection of hardware assets situated in a city CI-AA, the shared uplink 624 is comprised in the respective discrete collection of hardware assets situated in a city CI-BB, the switch 626 is comprised in the respective discrete collection of hardware assets situated in a city CI-CC, and the router 628 is comprised in the respective discrete collection of hardware assets situated in a city CI-DD.

A system asset in the form of an entity application can also be assigned a location assignment that classifies the entity application as having a location associated with a respective one of the network resources. Any suitable arbitrary assignment system can be used for this purpose including, for example, an assignment system that arbitrarily assigns a specific network resources such as a server as the respective location assignment of a particular entity application based upon the characteristic that the entity application is "hosted" on the server. To be sure, an entity application may be processed via a large multitude of network resources situated at various geographic venues. However, it may often be sufficient to arbitrarily assign a specific network resource as the respective location assignment of a particular entity application based upon some plausible criteria, for the reason that the traffic analytics data yielded via the method of the present invention will still be beneficial even though, as will be seen in the further discussion of the method herein, various ones of the network resources have been arbitrarily assigned as the respective location assignment of a particular entity application.

With continuing reference to FIG. 1, the traffic analytics method 310 includes a step 540 of ascribing to each communication signal of a base set of communication signals, a touchstone tag that indicates that the so-tagged communication signal has a transit relationship with a respective one of the network resources. The step of ascribing a touchstone tag to each communication signal of the base set of communication signals can be executed via anyone of a number of suitable tag ascribing approaches. For example, a touchstone tag can be individually ascribed to each communication signal or a plurality of touchstone tags can be ascribed in a groupwise-manner to a plurality of communication signals. Moreover, the touchstone tag ascribed to a communication signal can be dynamically ascribed which is a term used herein to indicate that a touchstone tag is ascribed to a communication signal as a function of a detection that the communication signal has actually originated from or been received by a respective network resource (with the communication signal thus being ascribed a touchstone tag indicating a transit relationship with this respective network resource). Alternatively, the touchstone tag ascribed to a communication signal can be ascribed in a non-dynamic manner which is a term used herein to indicate that a touchstone tag is ascribed to a communication signal without regard to whether there has been a detection that the communication signal has actually originated from or been received by a respective network resource.

Ascribing a touchstone tag to a communication signal in a non-dynamic manner may be performed, for example, based upon empirical data indicating an earlier transit relationship of the communication signal with the respective network resource. Furthermore, ascribing a touchstone tag to a communication signal in a non-dynamic manner may be performed via an algorithm approach wherein a calculation of an algorithm is performed upon providing suitable variables and non-variables for the algorithm. The variables and non-variables for the algorithm needed not mandatorily be based upon empirical data relating to communication signals traffic but can, instead, be variables or non-variables determined via any suitable estimation technique. It is to be understood that the terms "tag" or "tagging" are intended to encompass all manners of associating a communication signal with a network resource with which the communication signal has, or is believed to have, a transit relationship and neither term is to be limited by any requirement that information relating to the associating of a communication signal with a network resource must be physically coupled with the communication signal. Also, the terms "tag" or "tagging" are intended to encompass any construct for associating a communication signal with a network resource including a "pseudo-tag" construct via which a communication signal is deemed to have a transit relationship with a network resource solely for the purpose of facilitating the deployment of the traffic analytics method 310, even if no information exists that the communication signal has, in fact, a transit relationship with the respective network resource.

While the applicant does not wish to be bound by any particular approach to associating a communication signal with a network resource with which the communication signal has, or is believed to have, a transit relationship, it is noted that there exists a construct for designation logical addresses and physical addresses associated with a network and it is within the scope of the present invention that reference can be had to this construct in connection with selecting an approach for associating a communication signal with a network resource. An IP address is a 32-bit number or a 128-bit number assigned to a computer or device on the network that is unique to that network. A MAC address is a 48-bit number that has been hardwired into the network adapter which connects a computer or device to the network, this number being universally unique. Generally speaking, a MAC address is a unique code permanently assigned to a particular piece of networking hardware, while a machine name is another identifier of a computer on a network. The machine name may be assigned by the network operator to the computer when the computer is coupled to the network.

Logical addresses, such as IP addresses, may be analyzed for inferring that network traffic relates to a particular client. Because logical addresses change, locating a computer assigned to the IP address may be performed by sending look-up requests to a Dynamic Host Control Protocol (DHCP) server and/or an Active Directory server on the network. Instead, physical addresses, such as MAC addresses, may be used to infer that network traffic has transmitted a particular computer.

The traffic analytics method 310 further includes a step 550 of analyzing the communication traffic comprised of touchstone-tagged communication signals having transit relationships with the network resources of a first set of network resources 640 and a second set of network resources 642. The first resource location group may be any arbitrarily chosen set of network resources that have a location attribute in common with one another and the second resource location group may be any arbitrarily chosen set of network resources that have a location attribute in common with one another, with the first set of network resources and the second set of network resources being different from one another. The step 540 of analyzing the signals having transit relationships with the network resources of the first set of network resources and the second set of network resources, is performed for the purpose of deriving traffic analytics data from the analysis 644. The traffic analytics data 644 can be displayed, if desired, on a graphical user interface 646 and/or can be presented in any suitable human readable form.

The traffic analytics data 644 yielded by the traffic analytics method 310 may directly indicate certain performance characteristics of the in-place network 220 and/or may permit conclusions or inferences about the in-place network 220 to be drawn. For example, the traffic analytics data 644 may reveal that the system assets at a geographic venue of interest are significantly involved in the running of certain entity applications. For example, the traffic analytics data 644 may indicate that certain network resources at a particular geographic venue are routinely tapped by the hypervisor manager to handle significant virtualization tasks. The traffic analytics data 644 provides valuable performance information about the in-place network 220 because the traffic analytics data is harvested via a "flow-to-flow" approach in which the paths of the communication signals are analyzed independent of the static or prescribed traffic pattern that may be surmised based only upon the stated capacities and/or initial set up of the system assets.

The traffic analytics data 644 is qualitatively different than data typically obtained via known methods such as, for example, charting or discovery techniques that analyze the transmission of packets along end-to-end paths of network connections. Such techniques fail to provide the richer information about the actual packet transmission paths that can be provided by the traffic analytics method 310.

As can be appreciated, the traffic analytics method 310 can advantageously provide insights into the performance of the in-place network 220 and these performance insights can be leveraged to assist the operator of the in-place network 220 to make information technology (IT) management decisions such as, for example, decisions relating to replacing or upgrading system assets and including decisions about replacing some or all of the functionality of system assets via migration of selected network functions to a location external of the network—i.e., migration to a public or private cloud. As an example of the feature of performing the traffic analytics method 310 to assist in a cloud migration decision, further reference is had to FIG. 1, wherein it can be seen that the traffic analytics method 310 may optionally include a step 560 of assessing the traffic analytics data relative to a selection of migration scenarios each of which is a scenario wherein some or all of the functions performed by some or all of the system assets were instead to be performed at a location external to the network. Furthermore, as an example of the value to a network operator of performing the step 560 of assessing the traffic analytics data relative to a selection of migration scenarios, it can be further seen in FIG. 1 that the traffic analytics method 310 can also optionally include a step 570 of generating a migration consideration set comprised of cost information units that each include cost information about one of the migration scenarios.

The traffic analytics data 644 will be in many circumstances a sufficient proxy of the actual inputs/outputs (I/O) of the in-place network 220 that the operator of the in-place network 220 can confidently make IT management decisions to a substantial degree as if a complete real-time snapshot of the actual inputs/outputs (I/O) of the in-place network 220 had, in fact, been constructed. Advantageously, the tad can typically be generated at a significantly lower level of effort and cost than the effort and cost required to assemble a complete real-time snapshot of the actual inputs/outputs (I/O) of the in-place network 220. Moreover, the traffic analytics data 644 provides a data reference base from which a visualization of the in-place network 220 can be constructed and this visualization can be a convenient quick reference tool for the operator of the in-place network 220 in making IT management decisions. For example, the traffic analytics data 644 can serve as a data reference base from which to construct a server centric visualization which features a node/server centric visualization of the in-place network 220 including showing which servers a particular host is communicating with and which protocols it is using to communicate on the network with those servers. Alternatively, the traffic analytics data 644 can serve as a data reference base from which to construct an application centric visualization that shows which protocols a particular host is using to communicate on the network with other servers.

Returning again to further details of the step 540 of analyzing the communication traffic, it has been noted that the analysis of the communication traffic can be focused on communication signals having transit relationships with the network resources of the first set of network resources and the second set of network resources in order to derive traffic analytics data 644. Additionally, or alternatively, the analysis of the communication traffic can be focused on a difference or differences in the nature of communication signals flowing between a first inter-resource set (such as the first set of network resources and the second set of network resources) and communication signals flowing between a second inter-resource set (i.e., the second set of network resources and a third set of network resources that is different set than either the first set of network resources and the second set of network resources).

The analysis of the traffic analytics data 644 may be conducted to yield any suitable information about the in-place network 220. In this connection, it is believed that traffic analytics data yielded by the traffic analytics method 310 can often advantageously provide at least two types of yielded information that are probative with regard to assisting decisions about migrating some or all of the functions currently performed by some or all of the system assets to a location external to the network. The term "probative" as used herein is intended to mean that the yielded information may reveal that a particular migration scenario may be difficult or impractical or, conversely, that a particular migration scenario may be advantageous or helpful. The two types of yielded information noted as being probative are: (a) information about the volume of communication traffic to and between selected geographic venues (i.e., how much communication traffic exists between those geographic venues) and (b) the types of network resources involved in handling this communication traffic. Other types of yielded information will be advantageous as well and can serve the goals of providing a display of infrastructure assets and current performance levels, providing visibility about network components including network, virtualization, and Windows servers, guiding or improving the accuracy of predictions about infrastructure-as-a-Service (IaaS) components that may be needed from a variety of components providers, and permitting the network operator to clearly understand how much IaaS solutions will cost in a cloud model as compared to traditional delivery models.

In connection with the step 560 of assessing the traffic analytics data relative to a selection of migration scenarios and the step 570 of generating a migration consideration set comprised of cost information units, the migration consideration set may optionally include a plurality of cloud service providers who are deemed capable of performing a network computing task in lieu of the task being performed by the network and may further comprise a price qualified roster each member of which is a cloud service provider: (a) whose price for performing the task complies with a price acceptability criteria or (b) that has a respective price proposal associated therewith reflecting a price for engaging the cloud service provider to perform the task in lieu of the task being performed by the network. Moreover, this price qualified roster can be displayed in a format suitable for the network operator to, at the least, have a display of each alternative task performer in the price qualified set and its respective price proposal that reflects a price for engaging the alternative task performer to perform the task in lieu of the task being performed by the network. It is to be understood that the term "display" is used in a broad sense and encompasses all forms of communication in visual, aural, and tactile format and including both human- and machine-interface variations.

The method of the present invention can be executed manually but is preferably executed via a tangible computer-readable medium for controlling a computing device to generate an output. This tangible computer-readable medium may be connected (e.g., networked) to other machines in a Local Area Network (LAN), an intranet, an extranet, or the Internet. The tangible computer-readable medium may operate in the capacity of a server or a client machine in a client-server network environment, or as a peer machine in a peer-to-peer (or distributed) network environment. The tangible computer-readable medium may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to execute the steps of the method of the present invention.

The user interface via which the price qualified roster is accessible to a network operator may be configured as a stand-alone module that can be provided at no cost, at cost, or via leasing to network operators, wherein this stand-alone module may be configured to implement the method for facilitating network external computing assistance once operationally connected to a network. Alternatively, the user interface via which the price qualified roster is accessible to a network operator may be configured and controlled by an intermediary agent which is figuratively between the network operators seeking migration guidance and the cloud service providers. The intermediary agent may configure the user interface and may provide the ancillary services that harvest the data to be handled during the implementation of the method for facilitating network external computing assistance, such as, for example, the network discovery services that identify and catalog the assets of the network. Additionally, the intermediary agent may solicit, coordinate, and structure the display artifacts via which information about the "sponsoring" and "non-sponsoring" cloud service provider is provided to the network operators. In this connection, the intermediary agent may solicit participation from potential "sponsoring" cloud service provider by negotiating or prescribing a price offering menu, for example, or the intermediary agent may conduct a bidding process among potential "sponsoring" cloud service provider and award successful bid presenters with preferred listing opportunities, guaranteed minimum number of listing presentations, etc.

Figure 4:
FIG. 4 is a schematic illustration of a display that may be configured on, and configured via, a dashboard platform for displaying information about the price qualified sets obtained via the method of the present invention.
Figure 4:
Figure 4:
Figure 4:
Figure 4:
Figure 4:

As seen in FIG. 4, which is a schematic illustration of a display that may be configured on, and configured via, a dashboard platform for displaying information about the price qualified rosters obtained via the method of the present invention, such a display may be configured on, and configured via, a dashboard platform 470 and the dashboard platform 470 may be configured to provide an intentionally ordered presentation of the alternative task performer or performers in the price qualified roster with such presentation being communicated visually and/or aurally to the network operator. The intentionally ordered presentation of the alternative task performer or performers in the price qualified roster may be arranged, for example, so as to provide the network operator with a hierarchal listing of the alternative task performer or performers in the price qualified roster. As another example, the alternative task performer or performers in the price qualified roster may be so arranged, for example, so as to provide the network operator with a hierarchal listing of the alternative task performer or performers in the price qualified roster based upon directing the network operator to preferred resources that can help resolve metrics issues or capitalize upon identified opportunities. Further in this connection, the preferred resources can be comprised of vendors who have a particular capability such as, for example, cloud service providers having a particular capability, or vendors who are given preference relative to other vendors based upon a sponsorship criteria (i.e., "sponsoring" vendors are given a preferential showing in the display provided by the dashboard platform 470 as opposed to "non-sponsoring" vendors).

The exemplary format displayed by the dashboard 470 in FIG. 4 includes a "banner"-type listing 484 comprising information about a "sponsoring" cloud service provider and this "banner"-type listing 484 is presented in a text and graphics format. The "banner"-type listing 484 is presented as the topmost one of a vertical listing of the cloud service providers in the price qualified roster. For the purposes of illustration, it is assumed that the other cloud service providers 486 listed below the "banner"-type listing 484 are "non-sponsoring" cloud service providers. Information about the other cloud service providers 486 listed below the "banner"-type listing 484 are displayed in a text-only format or in another format selected to be less noticeable than the "banner"-type listing 484 comprising information about a "sponsoring" cloud service providers. Thus, by virtue of its topmost listing on the vertical listing of vendors and its more noticeable presentation in both text and graphics as opposed to text alone, the "banner"-type listing 484 comprising information about a "sponsoring" cloud service providers is given a preferential showing in the display provided by the dashboard platform 470 as opposed to the "non-sponsored" cloud service providers 486. "Banner"-type listings may be comprised solely of graphic, graphics and text, or text only and may include, for example, rich media (audio video), promotions, or any feature that increases the value of listing to a vendor or a potential vendor willing to give value in return for a status as a "sponsoring" vendor.

In accordance with one variant for displaying the price qualified roster, with particular application in the context of cloud service providers who agree to be "sponsoring" cloud service providers, cloud service providers may create and manage their listings through a user interface that permits the creation of one or more listing formats, the selection of details to associate with the listings, and an insert template that governs how and in which situations a listing will be displayed to a network operator. The cloud service provider may enter additional pieces of information and functionality pertaining to each listing. The cloud service provider may choose that a given listing be targeted only a discrete group of network operators, such as those meeting a set of customer demographics. Cloud service providers may set the specific price at which they are willing to offer their cloud services such as, for example, a single price or a price range for a "computing unit." If desired, cloud service providers may have the ability to be apprised of the price offerings of other cloud service providers in order, for example, to ensure that their listing appears in a desired position or to optimize the "click-through" response or contact response of the listing.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated by a computer system. It will be convenient at times, principally for reasons of common usage, to refer to the above-referenced signals as bits, values, elements, symbols, characters, terms, numbers or the like. It should be borne in mind, however, that all of these and similar terms are to be associated with the appropriate physical quantities and are merely convenient labels applied to these quantities.

Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Further, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Java object-oriented environment and the like. In general, however, all of the aforementioned terms as used herein are meant to encompass any series of logical steps performed in a sequence to accomplish a given purpose.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software.

One of ordinary skill in the art will immediately appreciate that the invention can be practiced with computer system configurations of any type, including hand-held devices, multiprocessor systems, microprocessor-based or programmable consumer electronics, DSP devices, network PCs, minicomputers, mainframe computers, personal computers, and the like. The invention can also be practiced in distributed computing environments where tasks are performed by remote processing devices that are linked through a communications network.

Figure 5:
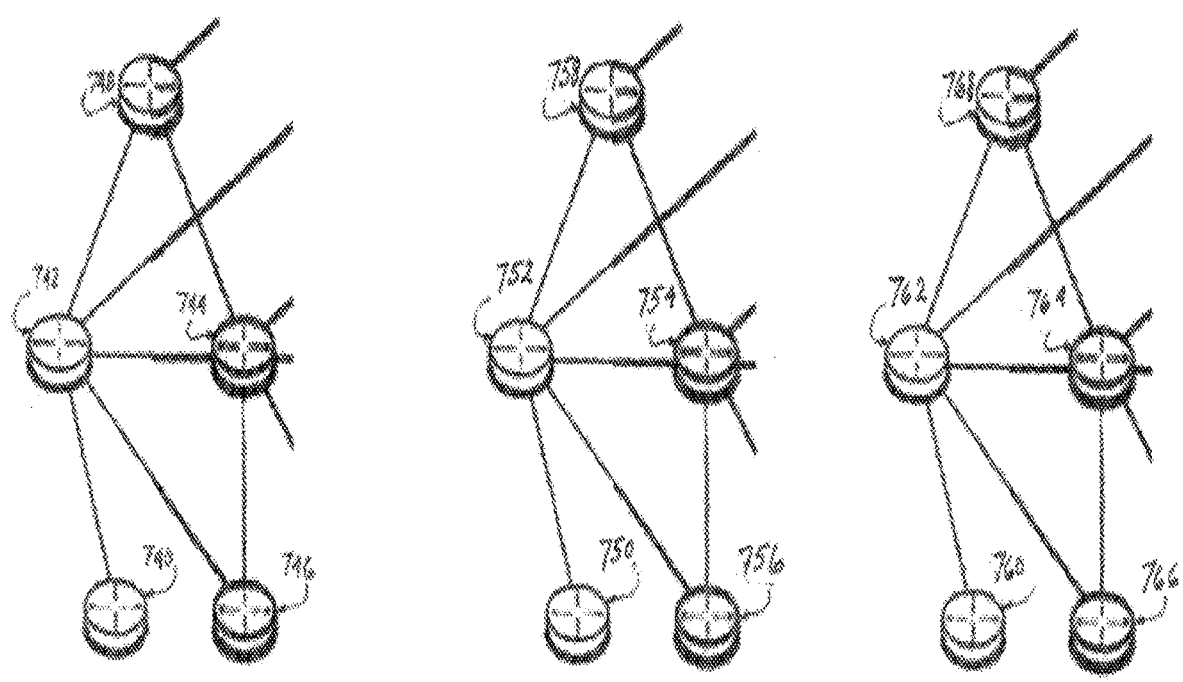
FIG. 5 is a schematic plan view of a portion of the nodes of a network.

One variation of the method for gathering traffic analytics data about a communication network is suitable for analyzing traffic analytics data about a communication network that includes a plurality of nodes and a plurality of connections between the nodes. Reference is had to FIG. 5, which is a schematic plan view of a portion of the nodes of a network. Each node of the network shown in FIG. 5 is one of the system assets of the network and, for purposes of illustrating an exemplary performance of the method, each node can be understood to be in the form of any known system asset of a communication network that is capable of communicating with another node of the network. The network shown in FIG. 5 includes a first group of nodes 740, 742, 744, 746, and 748, a second group of nodes 750, 752, 754, 756, and 758, and a third group of nodes 760, 762, 764, 766, and 768.

Figure 6:
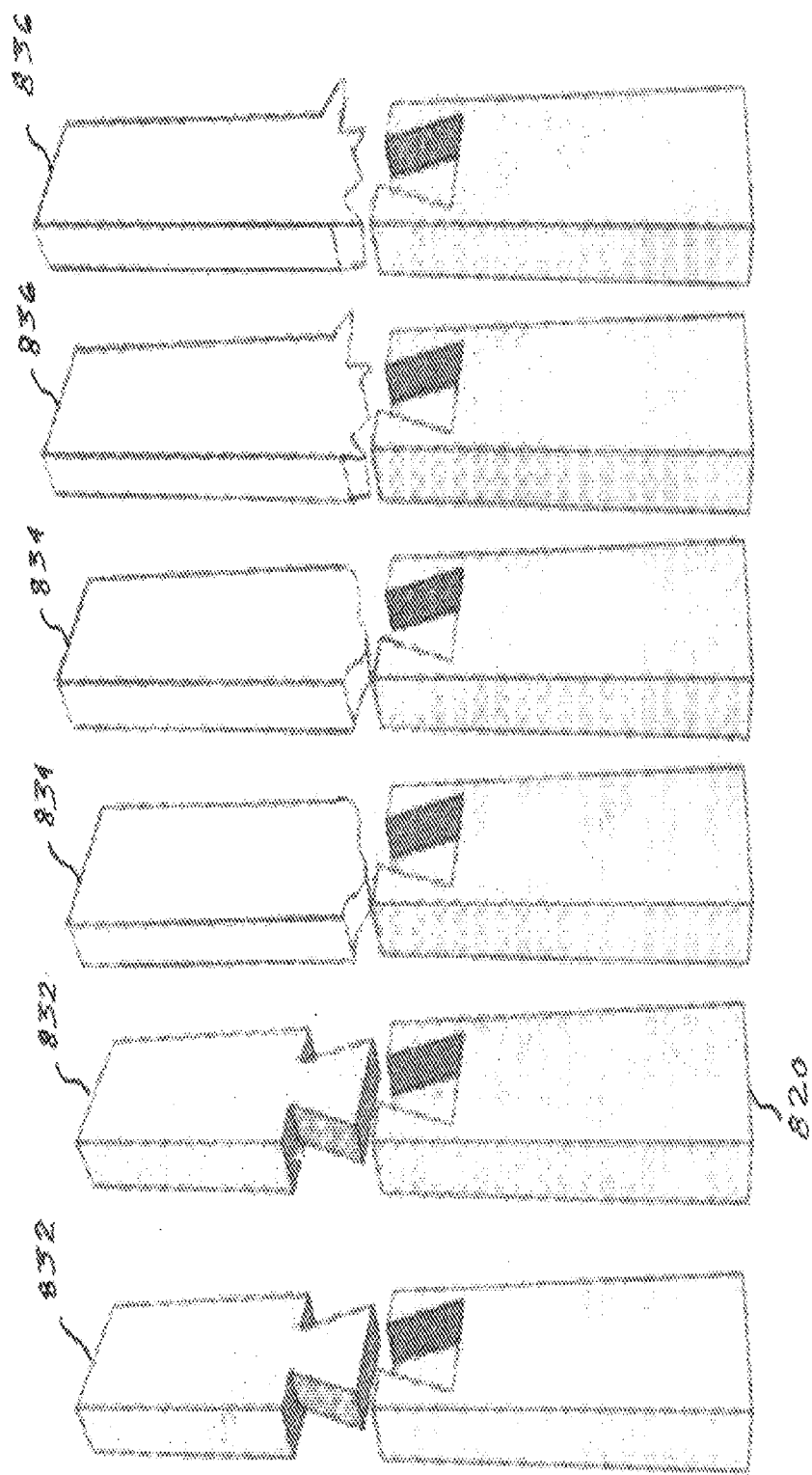
FIG. 6 is a schematic elevational view of a conceptualization of an initial portion of a determining step of one variation of the method.

The method includes performing a step of cataloging an initial location and this step includes identifying connectivity relationships between the nodes of a first group of nodes of the network, the identified connectivity relationships delimiting a first connectivity relationships set. As seen in FIG. 5, solely for the sake of illustration, a first group of nodes are arbitrarily allocated as being comprised of the nodes 740, 742, 744, 746, and 748. As will become clear, the method yields beneficial results no matter what arbitrary selection criteria is deployed to arbitrarily allocate certain nodes to the first group of nodes—with the consequent result that the non-allocated nodes that have not been allocated to this first group of nodes. The task of identifying connectivity relationships between the nodes of this first group of nodes of the network can be accomplished via any suitable approach for identifying connections between the nodes of a network. For example, here is a partial listing of several well known sources that can be consulted for gathering information about connections between the nodes of a network: a Common Data Dictionary [CDD], Low Level Direct Drive [LLDD], software-defined networking (SDN) databases, spanning trees, routing neighbors. MAC tables, VPN configurations, Logical Unit Numbers (LUNs), fiber cable (FC) topologies, and unified switch configurations. Data about connections between the nodes of a network can be normalized as needed or desired. After the step of cataloging an initial location has been performed, a next step of the method is then performed as follows. With respect to each identified connectivity relationship of the first relationship set, the method includes determining if the respective identified connectivity relationship is in compliance with a target array formation heuristic, whereupon each connectivity relationship of the first connectivity relationship set is catalogued into a respective one of a target array comprised of those connectivity relationships in compliance with the target array formation heuristic and a non-target array comprised of those connectivity relationships not in compliance with the target array formation heuristic. Reference is had to FIG. 6, which is a schematic elevational view of a conceptualization of an Initial portion of this determining step. A target array formation heuristic is a rule that stipulates a given characteristic or property that all members of a target array must possess to be deemed to be a member of the target array. For example, the target array formation heuristic may be a rule that none of the nodes of the respective group of nodes has a connection to a node that is at a different level as classified in the Open Systems Interconnection (OSI) seven-layer model, which had its origin in a reference model created by the International Standards Organization as a standard ISO/IEC 7498. system. As seen in FIG. 6, the target array formation heuristic 820 is applied to determine which, if any, of the connectivity relationships of the first connectivity relationship set are in compliance with the target array formation heuristic.

Figure 7:
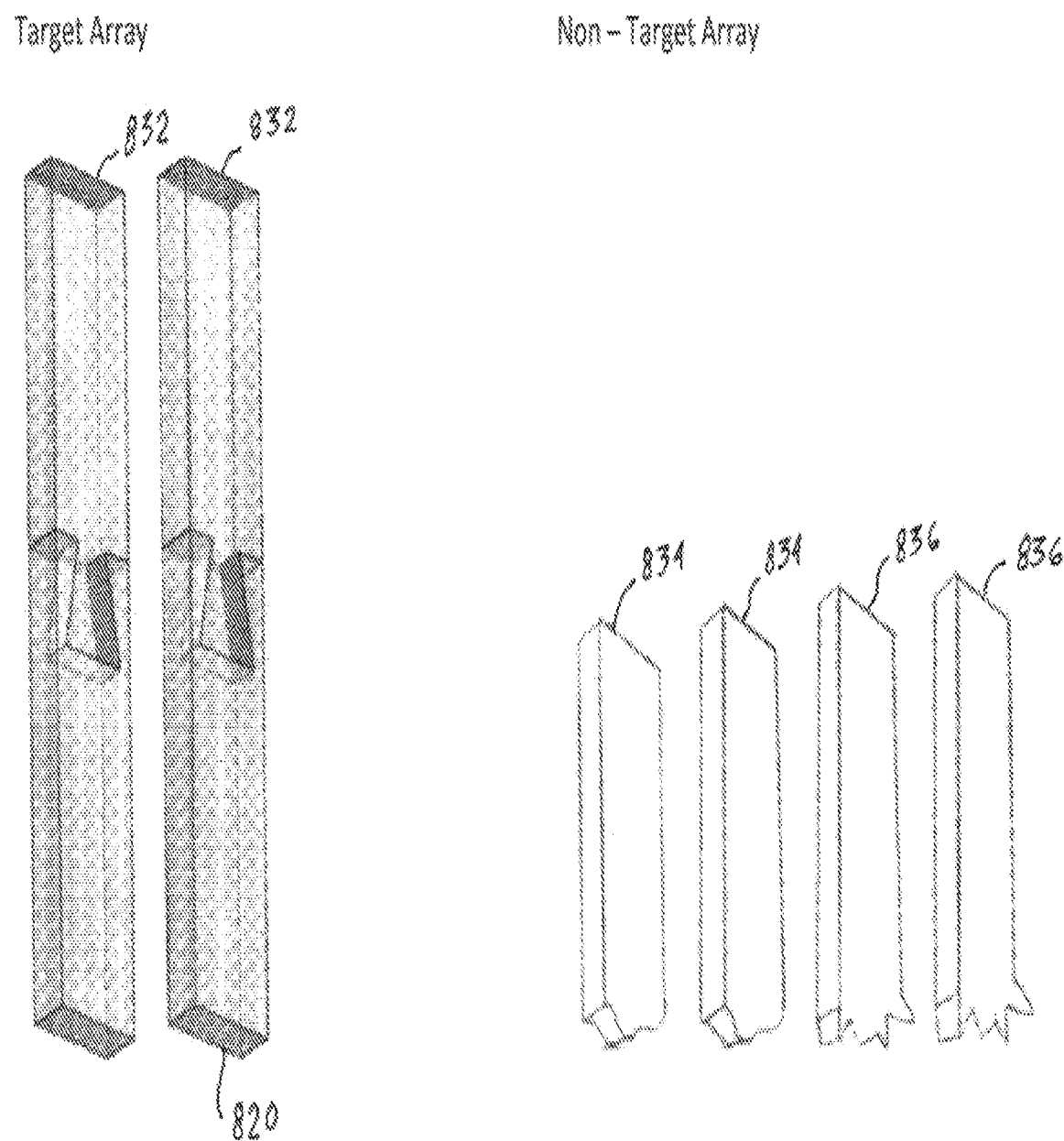
FIG. 7 is a schematic elevational view of a conceptualization of another portion of a determining step of one variation of the method.

The first connectivity relationship set, generally designated as the first connectivity relationship set 830, includes a first plurality of connections 832, a second plurality of connections 834, and a third plurality of connections 836. For the sake of illustration, only the first plurality of connections 832 of the first connectivity relationship set 830 are seen to be in compliance with the target array formation heuristic 820—that is, only the first plurality of connections 832 of the first connectivity relationship set 830 satisfy the rule that the respective connection between a given node and another node is a connection of the given node with a node that is at a different level as classified in the Open Systems Interconnection (OSI) seven-layer model. The second plurality of connections 834 and the third plurality of connections 836 are deemed, for the sake of illustration, as not being in compliance with the target array formation heuristic 820 (i.e., the nodes that are connected via the second plurality of connections 834 and the third plurality of connections 836 have a connection with a node that is at a different level as classified in the Open Systems Interconnection (OSI) seven-layer model). The second plurality of connections 834 and the third plurality of connections 836 are thus deemed to be members of a non-target array comprised of those connectivity relationships not in compliance with the target array formation heuristic 820, as seen in FIG. 7, which is a schematic elevational view of a conceptualization of this portion of the determining step.

Figure 8:
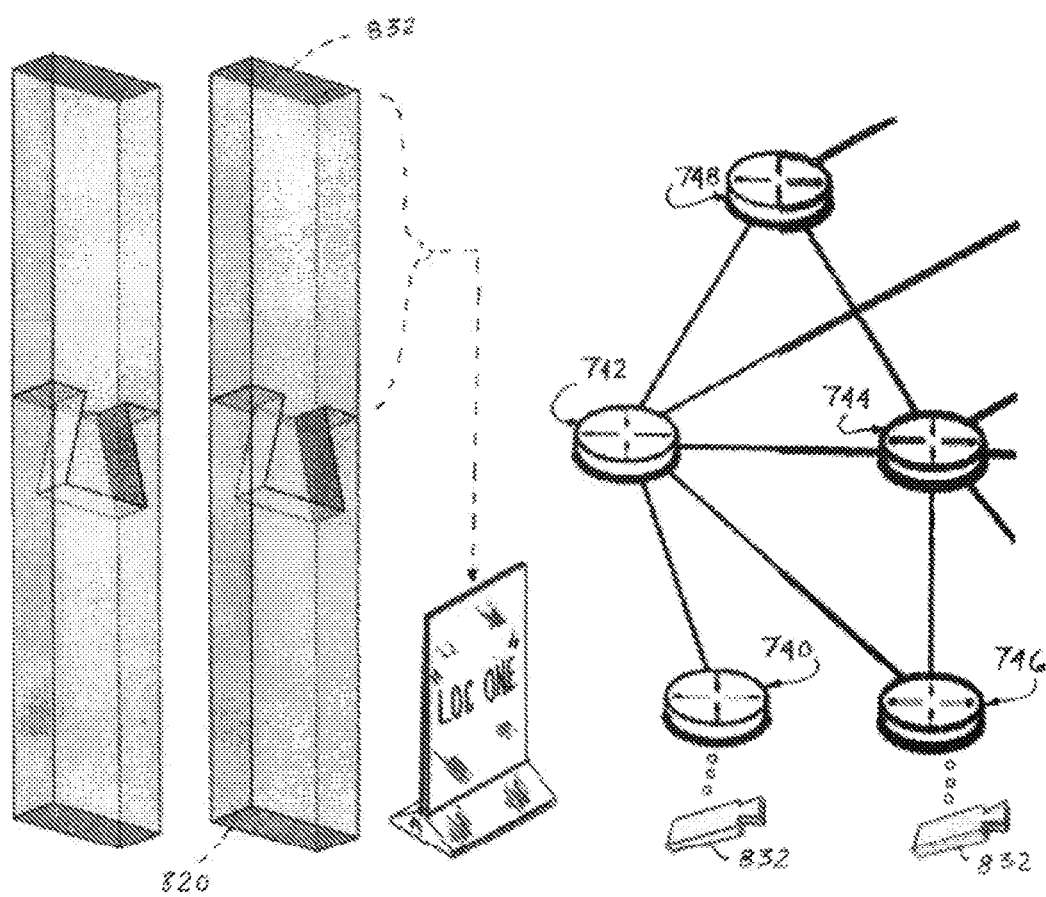
FIG. 8 is a schematic elevational view of a conceptualization of a portion of a determining step of one variation of the method.

The method thereafter includes a designating step with respect to certain nodes of the first group of nodes of the network. Specifically, with respect to those nodes of the first group of nodes of the network whose connectivity relationships are in compliance with the target array formation heuristic, the step involves designating such nodes with a common location designator that is unique from other location designators that have been associated, via a step of cataloging a location, with nodes of the network. For example, as seen in FIG. 8, which is a schematic elevational view of a conceptualization of this designating step, those nodes of the first group of nodes of the network whose connectivity relationships are In compliance with the target array formation heuristic 820—namely, those nodes of the first group of nodes of the network whose connectivity relationships are the first plurality of connections 832 of the first connectivity relationship set 830—are designated with a common location designator "LOC ONE" that is unique from all other location designators. The node 740 and the node 746 of the first group of nodes of the network are representatively shown in FIG. 8 as representing those nodes whose connectivity relationships are the first plurality of connections 832.

The method then includes performing a step of cataloging a subsequent location and this step includes, with respect to a subsequent group of nodes of the network that is different from other groups of nodes of the network that have been subjected to a location cataloging step of the method, identifying connectivity relationships between the nodes of the subsequent group of nodes, the identified connectivity relationships delimiting a subsequent connectivity relationship set, and the step of identifying connectivity relationships between the nodes of the subsequent group of nodes including considering only those connectivity relationships that have not previously been designated with a location designator during a step of cataloging a location. Thus, a subsequent group of nodes of the network that is different from other groups of nodes of the network that have been subjected to a location cataloging step of the method—namely, a subsequent group of nodes of the network that is different from first groups of nodes of the network that has been subjected to a location cataloging step of the method—is now identified and, as before, the method yields beneficial results no matter what arbitrary selection criteria is deployed to arbitrarily allocate certain nodes to the subsequent group of nodes—with the consequent result that the other nodes are not allocated to this subsequent group of nodes.

The method further includes, with respect to each identified connectivity relationship of the subsequent connectivity relationship set, determining if the respective identified connectivity relationship is in compliance with the target array formation heuristic, whereupon each connectivity relationship of the subsequent connectivity relationship set is catalogued into a respective one of the target array comprised of those connectivity relationships in compliance with the target array formation heuristic and the non-target array comprised of those connectivity relationships not in compliance with the target array formation heuristic. Thus, each identified connectivity relationship of the subsequent connectivity relationship set is evaluated to determine if it is in compliance with the target array formation heuristic 820. Thereafter, the method thereafter includes a designating step with respect to certain nodes of the subsequent group of nodes of the network. Specifically, with respect to those nodes of the subsequent group of nodes of the network whose connectivity relationships are In compliance with the target array formation heuristic 820, the step involves designating such nodes with a common location designator that is unique from other location designators that have been associated, via a step of cataloging a location, with nodes of the network. For example, those nodes whose connectivity relationships are in compliance with the target array formation heuristic 820 can be designated with a common location designator "LOC TWO" that is unique from other location designators (i.e., it is different than the common location designator "LOC ONE" and all other location designators).

The method includes repeating the step of cataloging a subsequent location until at least two nodes of the network have been designated with a location designator. Thus, the step of cataloging a subsequent location can be iterated until all the nodes of a given portion of a network, or the entirety of the nodes of the network, have been cataloged such that each node is associated with a respective common location designator such as, for example, the common location designator "LOC ONE" or the common location designator "LOC TWO."

The method further includes analyzing the communication traffic by referring to the location designators and deriving traffic analytics data from the analysis. As can be understood, benefits can be derived in the context of traffic analytics data via exploitation of the data yielded via performance of the method of the present invention. For example, a person desiring to determine possible migration strategies in which the functions of some or all of the system assets of a network are shifted to a cloud based operation can obtain a ready picture of those system assets of the network whose functions could be shifted to a cloud based operation in a manner that reduces the risk that other system assets of the network whose functions have not been shifted to the cloud based operation will still operate smoothly. For example, a person can obtain a ready picture of those system assets of the network that do not have an "inter-level" connection (a connection between a node at one level as classified In the Open Systems Interconnection (OSI) seven-layer model) and a node at a different level as classified in the Open Systems Interconnection (OSI) seven-layer model), whereupon, in some circumstances, the ability to shift only the functions of those system assets of the network that do not have an "inter-level" connection to a cloud based operation may advantageously reduce the risk that the functioning of non-shifted nodes of the network will be inadvertently impaired due to, say, the shut down of those "shifted" system assets of the network whose functions have been shifted to the cloud based operation.

The invention claimed is:

1. A system comprising:
computer-readable memory storing executable instructions; and
one or more processors in communication with the computer-readable memory and configured by the executable instructions to at least:
monitor communications among a first set of system assets of a first networked environment, the monitored communications associated with performance of computing tasks of the first networked environment, wherein the first set of system assets comprises a plurality of hardware resources and a plurality of applications;
determine, for individual communications of the monitored communications, a transit relationship comprising an originating system asset and a target system asset, wherein the first set of system assets includes the originating system asset and the target system asset;
generate traffic analytic data based at least partly on transit relationships of the monitored communications, wherein the traffic analytic data identifies transmission paths through system assets of the first set of system assets; and
identify, based on the traffic analytic data regarding the monitored communications, a computing task of the first networked environment as a migration candidate to be migrated to a second networked environment, wherein the second networked environment comprises a second set of system assets.

2. The system of claim 1, wherein the one or more processors are configured by further executable instructions to generate the traffic analytic data based at least partly on a volume of monitored communications occurring along transmission paths through the system assets of the first set of system assets.

3. The system of claim 1, wherein the one or more processors are configured by further executable instructions to generate the traffic analytic data based at least partly on one or more types of system assets along transmission paths through the system assets of the first set of system assets associated with the monitored communications.

4. The system of claim 1, wherein the one or more processors are configured by further executable instructions to analyze the traffic analytic data with respect to a plurality of migration scenarios, wherein a migration scenario of the plurality of migration scenarios comprises migration of a candidate computing task of the first networked environment to a candidate networked environment.

5. The system of claim 4, wherein the computing task being identified as the migration candidate based on the traffic analytic data comprises the computing task being identified as the migration candidate based on a result of analyzing the traffic analytic data with respect to the plurality of migration scenarios.

6. The system of claim 1, wherein the one or more processors are configured by further executable instructions to analyze a first transit relationship with respect to a target array heuristic.

7. The system of claim 6, wherein the one or more processors are configured by further executable instructions to assign the first transit relationship to a target array of system assets based on the first transit relationship satisfying the target array heuristic.

8. The system of claim 1, wherein the one or more processors are configured by further executable instructions to generate a graphical user interface comprising a hierarchical listing of alternative networked environments for migration of the migration candidate, wherein the hierarchical listing is based at least partly on capabilities of the alternative networked environments.

9. The system of claim 1, wherein the one or more processors are configured by further executable instructions to construct a server and node centric visualization of the first networked environment.

10. The system of claim 1, wherein the one or more processors are configured by further executable instructions to construct an application centric visualization of the first networked environment.

11. A computer-implemented method comprising:
under control of a computing system comprising one or more computing devices configured with specific computer-executable instructions:
monitoring communications among a first set of system assets of a first networked environment, the monitored communications associated with performance of computing tasks of the first networked environment, wherein the first set of system assets comprises a plurality of hardware resources and a plurality of applications;
determining, for individual communications of the monitored communications, a transit relationship comprising an originating system asset and a target system asset, wherein the first set of system assets includes the originating system asset and the target system asset;
generating traffic analytic data based at least partly on transit relationships of the monitored communications, wherein the traffic analytic data identifies transmission paths through system assets of the first set of system assets; and
identifying, based on the traffic analytic data regarding the monitored communications, a computing task of the first networked environment as a migration candidate to be migrated to a second networked environment, wherein the second networked environment comprises a second set of system assets.

12. The computer-implemented method of claim 11, further comprising generating the traffic analytic data based at least party on a volume of monitored communications occurring along transmission paths through the system assets of the first set of system assets.

13. The computer-implemented method of claim 11, further comprising generating the traffic analytic data based at least party on one or more types of system assets along transmission paths through the system assets of the first set of system assets associated with the monitored communications.

14. The computer-implemented method of claim 11, further comprising analyzing the traffic analytic data with respect to a plurality of migration scenarios, wherein a migration scenario of the plurality of migration scenarios comprises migration of a candidate computing task of the first networked environment to a candidate networked environment.

15. The computer-implemented method of claim 14, wherein identifying the computing task as the migration candidate based on the traffic analytic data comprises identifying the computing task as the migration candidate based on a result of analyzing the traffic analytic data with respect to the plurality of migration scenarios.

16. The computer-implemented method of claim 11, further comprising analyzing a first transit relationship with respect to a target array heuristic.

17. The computer-implemented method of claim 16, further comprising assigning the first transit relationship to a target array of system assets based on the first transit relationship satisfying the target array heuristic.

18. The computer-implemented method of claim 11, further comprising generating a graphical user interface comprising a hierarchical listing of alternative networked environments for migration of the migration candidate, wherein the hierarchical listing is based at least partly on capabilities of the alternative networked environments.

19. The computer-implemented method of claim 11, further comprising constructing a server and node centric visualization of the first networked environment.

20. The computer-implemented method of claim 11, further comprising constructing an application centric visualization of the first networked environment.

\* \* \* \* \*